June 24, 1958
H. W. POPE
2,839,931
GYROSCOPE
Filed Aug. 26, 1954
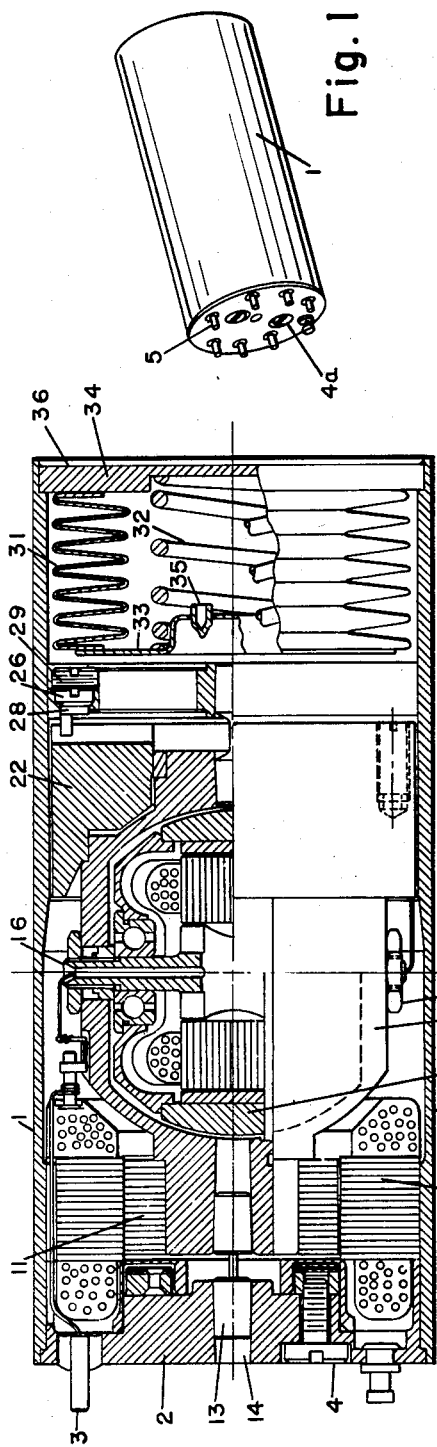
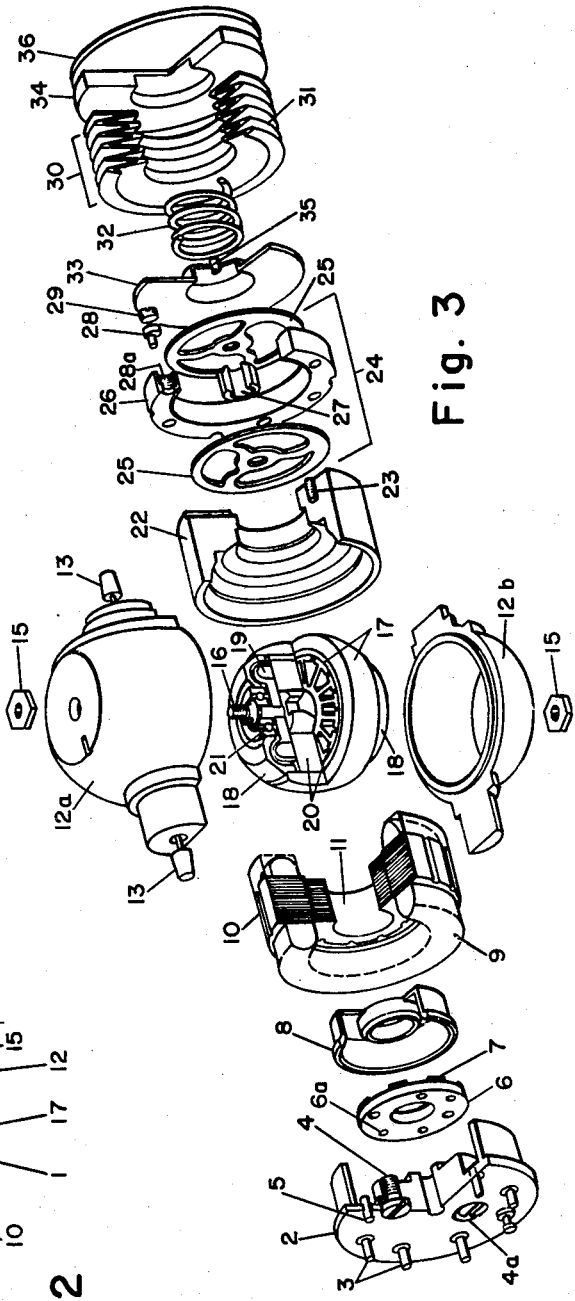
Harold W. Pope
INVENTOR.
BY
Attorney United States Patent Office 2,839,931
Patented June 24, 1958

2,839,931

GYROSCOPE

Harold W. Pope, Nashua, N. H., assignor, by mesne assignments, to Sanders Associates, Incorporated, Nashua, N. H., a corporation of Delaware Application August 26, 1954, Serial No. 452,380

6 Claims. (Cl. 74—5)

This invention relates generally to gyroscopes and, more particularly, rate gyros, of the type employed in modern aircraft, guided missiles and the like. It is particularly directed to the provision of means for compensating for changes in volume of fluid and component parts disposed within the gyro housing.

In the prior art, there are many gyroscopes which have been developed for use under constant temperature conditions. It is frequently desirable, however, and in fact essential, to employ gyroscopes under conditions wherein wide temperature variations are encountered. To permit maximum freedom of motion of the components of the gyroscopes while minimizing mechanical oscillation and gimbal support loads, it is common practice to completely surround and suspend all moving parts in buoyant, damping fluids characterized by suitable density and coefficient of viscosity. The fluid effectively minimizes the effects of mechanical shock to which the gyro may be subjected. Extreme temperature variations effect expansions and contractions of the various components and the fluid, and thereby vary the pressure acting on the gimbal suspension, housing and other component parts to cause distortions which produce false indications of rate.

Various devices have been provided in the prior art for compensating for changes in volume within the gyro housing. For example, such a device is shown in U. S. Patent 2,618,159 to F. V. Johnson et al. Such devices, however, have effected the volume compensation by permitting the damping fluid to flow into an expansible bellows, as distinguished from the present invention wherein an evacuated chamber is employed to provide this operation in the manner to be described hereinafter.

It is therefore and object of the present invention to provide an improved subminiature gyroscope having means for compensating for volume changes in the components and fluid thereof due to variations in temperature.

It is a further object of the present invention to provide an improved subminiature gyroscope having means for compensating for volume changes in the components and fluid thereof completely contained within the housing.

Other and further objects of the invention will be apparent from the following description of a preferred embodiment thereof, taken in connection with the accompanying drawings.

In accordance with the present invention, there is provided a gyroscope comprising a gimbal and a rotor having an axis of spin and supported within the gimbal. A housing supports the gimbal to permit its rotation about an axis perpendicular to the axis of spin. A fluid within the housing surrounds the gimbal. A partially evacuated chamber within the housing expands and compresses with changes in pressure within the housing to compensate for variations in volume of the component parts within the housing due primarily to variations in temperature. In a preferred embodiment the chamber comprises an evacuated resilient bellows having an end in contact with the fluid. A spring member is disposed within the chamber to exert pressure against the ends thereof.

An S-spring arrangement may be provided at one end of the gyro, which leaves the movable parts of the gyro assembly relatively free to move longitudinally while they are held rigid against transverse forces. This, among other advantages, prevents different rates of expansion of the gyro parts from placing special strain on the torsion bars. The compensating chamber of the present invention is preferably disposed adjacent the S-spring assembly.

By virtue of the various features of invention employed in the construction herein described there is achieved a subminiature gyro, less than one inch in diameter, only slightly more than two inches in length and weighing approximately only 2.3 ounces. This constitutes the smallest gyro now known to exist and meets or exceeds the performance characteristics of larger rate gyros, yet it may be produced more economically than other available instruments.

For a more detailed description of the present invention, reference may now be made to the following description taken in connection with the accompanying drawing.

In the drawing, Fig. 1 is an isometric side view of a gyroscope embodying the present invention shown in actual size; Fig. 2 is an enlarged, cross-sectional view of the gyroscope of the present invention; and Fig. 3 is an enlarged, exploded, isometric view, partly in section, of component parts of the gyro shown in Figs. 1 and 2.

Referring now more particularly to the drawing, the gyro embodying the present invention, as shown, comprises a housing 1 of generally cylindrical form having attached at one end a cap 2. Provided in the end cap 2 are leads 3 and null adjusting screws 4. The screws are inserted in their respective holes 6a in a null adjusting ring 6 through the elongated holes 4a in the end cap permitting a limited amount of lateral movement of the screws 4 and ring 6. A hollow tube 5 is provided in the end cap for evacuating the interior of the casing as hereinafter explained. The null adjusting ring 6 is provided adjacent to the end cap 2 with the screws and respective holes 6a and pick-off adjustment element or laminations 7 secured thereto as shown. A sealing ring 8 is provided at the opposite side of ring 6 with its outer edge surrounding the ring 6 and extending into the end cap 2. Followed thereby are pick-off windings 9 in which there is disposed a pick-off stator 10 and rotor 11, comprising transformer laminations as shown.

A gimbal 12 is disposed within the central portion of the housing, as shown, in Fig. 2, and comprises the split upper and lower sections 12a and 12b which are shown in detail in Fig. 3.

Torsion bars 13 are disposed at opposite ends of the gimbal. Each bar comprises a narrow central portion which provides spring restraint and an enlarged end portion which is formed integrally therewith and effects rigid and strong support. The end portions of the bars are tapered and the supports on the gimbal, the end cap 2, and the hub or mount 27 of the S-spring assembly, presently to be described, are correspondingly tapered. They provide the rigid lateral and longitudinal support while permitting rotative movement of the gimbal about the output axis. The torsion bars also afford a restraining torque which resists the angular movement about the output axis of the gimbal and returns the gimbal and rotor to their normal relative angular positions immediately after the input torque to the gyro has been removed. Friction is thus essentially eliminated from the output axis of the gyro.

The nuts 15 at the top and bottom of the gimbal sections secure the shaft 16 of the rotor 17. Suitable bearing retainers and bearings 21 are disposed at each end of the rotor shaft providing a symmetrical, balanced, noncantilever type of support. Caps 18 are provided for the rotor at each end thereof. The two sections of the gimbal are retained by the pick-off rotor 11 and an annular member 22 referred to hereinafter. In this member several balancing screws 23 may be secured, one being shown in Fig. 3 disposed at the end of the housing.

An arrangement is provided for preventing special strain on the operating parts of the gyro, particularly the torsion bars, which is occasioned by different rates of expansion of the parts within the gyro, with temperature changes. An S-spring assembly 24 is disposed at one end of the housing. This assembly comprises a pair of S-springs 25 disposed on opposite sides of a ring member 26, as shown. A hub element 27 which includes a tapered mounting for the torsion bar 13, previously mentioned, and output axis stop pin 28 with lock 29 are provided disposed in a partially threaded hole 28a in the member 26, these parts being shown separately in Fig. 3 and assembled in Fig. 2. The pin 28 extends into a slot in the annular member 22 which is fixed and rotates with the gimbal. The slot is of a predetermined width and the pin 28 thus limits the amount of angular movement which is allowed the ring 22 and gimbal 12.

In accordance with the present invention there is provided a chamber 30 comprising a bellows having a plurality of pleats 31 as shown. Centrally disposed within the chamber 30 is a helical spring 32 and end members 33 and 34 enclose the chamber. A tube 35 is secured centrally in the member 33 through which the interior of the chamber 30 is evacuated during fabrication, the tube being then closed or pinched off to maintain the vacuum. The chamber is then assembled, together with the other gyro parts, within the housing and held in place by the cap 36 as shown in Fig. 2.

The entire space within the casing and surrounding the gimbal is filled with oil. The device is fabricated in the ambient temperature equal to the maximum operating temperature. The chamber is then evacuated through the tube 5. Oil under atmospheric pressure and at the maximum operating temperature is then applied through the tube 5 in the end plate 2 to fill the evacuated space. After filling, the tube 5 is hermetically sealed (for example, with solder). The spring 32 is so chosen that the bellows 31 is completely collapsed at atmospheric pressure. This is the condition at the maximum operating temperature.

Under normal ambient conditions (for example, 70° F.), the contractions of the various components and the fluid within the housing reduces the pressure acting on the plate 33 and tends to leave the space within the housing imperfectly filled. The spring 32 causes the bellows 31 to expand to maintain substantially a constant pressure on the gyro gimbal assembly and keep the space surrounding it filled with fluid. The spring stiffness is so chosen that at minimum operating temperature the spring 32 exerts a sufficient force to overcome the force of the fluid exerted upon it when the gyro casing is subjected to movement with relatively great acceleration (for example, 60 times the acceleration of gravity). The spring thereby prevents a void from occurring in the fluid during the application of acceleration. A housing cap 36 is secured at the bellows end of the housing.

The chamber 30, thus provides compensation for volume changes caused by temperature variations within the housing of the gyro housing. Such variations may be very substantial where the gyro is employed, for example, in guided missiles, which travel at extremely high speeds occasioning higher surface friction. The housing or casing being filled with the damping fluid or oil, the temperature cycles occasion different rates of expansion between the fluid and the housing, which, if not compensated for, would seriously impair the accuracy and general operation of the gyro. The differences in expansion, however, being compensated for by the expansion and compression of the chamber 30, the relative changes in volume occasioned by these differences between the expansion of the fluid and parts within the housing and the housing itself are compensated for.

From the above description it is clear that the volume compensator is also a temperature indicator. The variations in expansion and compression of the chamber with variations in temperature may be used to control other gyro characteristics that vary with temperature.

The S-spring assembly permits the rotor and the torsion bars at this end of the housing to be relatively free for longitudinal movement, while remaining rigidly fixed for transverse forces. Among its other advantages, this arrangement compensates for special strains on the torsion bars and other parts of the gyro.

In order to maintain the stability of the gyro, as stated, the fluid in the housing provides a damping of the movement of the gimbal about the output axis. Also, the gimbal being immersed in the fluid is given a partially buoyant support which has the effect of reducing its sensitivity to linear acceleration and shock.

The damping member 22 is constructed of a suitable material, such as nylon, which expands and contracts with increasing and decreasing temperatures, adjusting the gap between it and the housing. It thus increases the shearing damping action of the fluid so as to compensate for its contraction due to the loss of viscosity of the fluid with temperature increases. A low viscosity variation of the damping fluid with temperature over a wide range and the above-mentioned compensation permits operation of the gyro with a minimum variation of damping, down to extremely low temperatures and without requiring employing external heaters to stabilize the damping fluid temperature. The damping fluid employed for the present gyro, which is commercially available as Dow Corning 200 Series Silicone, has this low viscosity variation with temperature.

The pick-off of the present gyro is basically a differential transformer, the mutual inductance between the primary and secondary of which is varied with variations in the relative angular position of the core laminations. This in turn is effected by the rotation of the output shaft or gimbal. Thus, this movement is translated into an electrical signal which is proportional and phase sensitive, that is directly responsive, to the gyro input angular velocity.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A gyroscope comprising a gimbal; a rotor having an axis of spin and supported within said gimbal; a housing supporting said gimbal to permit its rotation about an axis perpendicular to said axis of spin; a fluid within said housing surrounding said gimbal; an expansible, evacuated chamber within said housing; and a resilience means within said chamber enabling said chamber to be expansible and compressible with changes in pressure within said housing to compensate for variations in volume of the component parts within said housing.

2. A gyroscope comprising a gimbal; a rotor having an axis of spin and supported within said gimbal; a housing for said gimbal; means within said housing and supporting said gimbal at its opposite ends to permit rotation of said gimbal about a second axis perpendicular to said axis of spin, with limited longitudinal movement along said second axis; a buoyant fluid within said housing surrounding said gimbal for damping movement thereof and maintaining said gimbal substantially in liquid suspension; an expansible, evacuated chamber within said housing adjacent one end of said gimbal; and a resilience means causing said chamber to be compressible and expansible with changes in volume of component parts within said housing to compensate for said changes.

3. A gyroscope comprising a gimbal; a rotor having an axis of spin and supported within said gimbal; a housing for said gimbal; means within said housing and supporting said gimbal at its opposite ends to permit rotation of said gimbal about a second axis perpendicular to said axis of spin, with limited longitudinal movement along said second axis; a buoyant fluid within said housing surrounding said gimbal for damping movement thereof and maintaining said gimbal substantially in liquid suspension; an expansible, evacuated chamber within said housing; and a spring member disposed within said chamber exerting pressure against the ends thereof to expand said chamber and compensate for variations in volume of the component parts within said housing, said spring member having a spring constant substantially independent of temperature variations and so chosen as to provide substantially constant pressure on the components within said housing in a relatively wide operating temperature range.

4. A gyroscope comprising a gimbal; a rotor having an axis of spin and supported within said gimbal; a housing for said gimbal; means within said housing and supporting said gimbal at its opposite ends to permit rotation of said gimbal about a second axis perpendicular to said axis of spin, with limited longitudinal movement along said second axis; a buoyant fluid within said housing surrounding said gimbal for damping movement thereof and maintaining said gimbal substantially in liquid suspension; and a chamber comprising an evacuated, resilient bellows having an end in contact with said fluid and being expansible and compressible with changes in volume of component parts within said housing occasioned by temperature variations of said housing and elements therein.

5. A gyroscope, comprising: a gimbal; a rotor with an axis of spin and supported within said gimbal; a housing for said gimbal; an S-spring assembly for extending spring tension with respect to gimbal supporting means; gimbal supporting means within said housing, supporting said gimbal at its opposite ends and permitting rotation of said gimbal about a second axis perpendicular to said axis of spin, with limited longitudinal movement against said spring tension along said second axis at one of said ends; a buoyant fluid within said housing surrounding said gimbal for damping movement thereof; an expansible, evacuated bellows adjacent one end of said gimbal within said housing; and resilience means disposed within said bellows exerting pressure against the ends thereof causing said bellows to expand and contract with changes in volume of component parts within said housing, said resilience means having a spring constant so chosen as to maintain substantially a constant pressure on said component parts throughout a wide operating temperature range.

6. An inertial guidance instrument having a mass member pivotal about an axis, comprising: a pivotal mass member; a housing for said mass member; means for suspending said mass member with respect to said housing for enabling its pivotal motion about an axis; a buoyant fluid within said housing surrounding said mass member for damping movement thereof; an expansible, evacuated chamber within said housing; and a resilience means within said chamber enabling said chamber to be expansible and compressible with changes in pressure within said housing to compensate for variations in volume of the component parts within said housing.

References Cited in the file of this patent

UNITED STATES PATENTS

| | | |
|---|---|---|
| 2,383,461 | Esval et al. | Aug. 28, 1945 |
| 2,585,024 | Lundberg | Feb. 12, 1952 |
| 2,618,159 | Johnson et al. | Nov. 18, 1952 |